United States Patent
Matsunaga et al.

(10) Patent No.: US 11,482,816 B2
(45) Date of Patent: Oct. 25, 2022

(54) OIL TEMPERATURE SENSOR

(71) Applicant: Yazaki Corporation, Tokyo (JP)

(72) Inventors: Kazuyuki Matsunaga, Shizuoka (JP);
Shingo Nomoto, Shizuoka (JP);
Keisuke Yamauchi, Shizuoka (JP);
Toshirou Mochizuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 780 days.

(21) Appl. No.: 16/441,180

(22) Filed: Jun. 14, 2019

(65) Prior Publication Data

US 2019/0386437 A1 Dec. 19, 2019

(30) Foreign Application Priority Data

Jun. 18, 2018 (JP) .............................. JP2018-115167

(51) Int. Cl.
| | |
|---|---|
| H01R 13/66 | (2006.01) |
| H01R 13/405 | (2006.01) |
| G01K 7/22 | (2006.01) |
| H01R 4/18 | (2006.01) |
| G01K 1/08 | (2021.01) |
| H01R 13/424 | (2006.01) |

(52) U.S. Cl.
CPC ........... *H01R 13/6683* (2013.01); *G01K 1/08* (2013.01); *G01K 7/22* (2013.01); *H01R 4/185* (2013.01); *H01R 13/405* (2013.01); *H01R 13/424* (2013.01)

(58) Field of Classification Search
CPC .. H01R 13/6683; H01R 4/185; H01R 13/405; H01R 13/424; G01K 1/08; G01K 7/22; G01K 13/02; G01K 13/026; G01K 1/14
See application file for complete search history.

(56) References Cited

U.S. PATENT DOCUMENTS

| | | | |
|---|---|---|---|
| 2003/0102955 A1* | 6/2003 | Morin | H01H 35/343 337/299 |
| 2003/0147452 A1* | 8/2003 | Adachi | G01K 13/02 374/185 |
| 2016/0305825 A1 | 10/2016 | Chokri | |
| 2019/0386419 A1* | 12/2019 | Matsunaga | G01K 13/026 |
| 2019/0386437 A1* | 12/2019 | Matsunaga | G01K 13/026 |

FOREIGN PATENT DOCUMENTS

| | | | |
|---|---|---|---|
| JP | 04-085135 U | 7/1992 | |
| JP | 06-016835 U | 3/1994 | |
| JP | H1164116 A * | 3/1999 | ............... H01C 7/04 |
| JP | H08114508 A * | 5/1999 | ............... G01K 7/22 |
| JP | 2013-044693 A | 3/2013 | |

* cited by examiner

*Primary Examiner* — Truc T Nguyen
(74) *Attorney, Agent, or Firm* — Sughrue Mion, PLLC

(57) ABSTRACT

An oil temperature sensor includes a sensor body that detects the temperature of oil. The sensor body is formed by covering a thermistor mounted on a first lead frame and a second lead frame with a resin mold portion. The sensor body is fixed to the housing in a manner that the resin mold portion is buried and a first terminal portion and a second terminal portion are partially exposed to space.

8 Claims, 12 Drawing Sheets

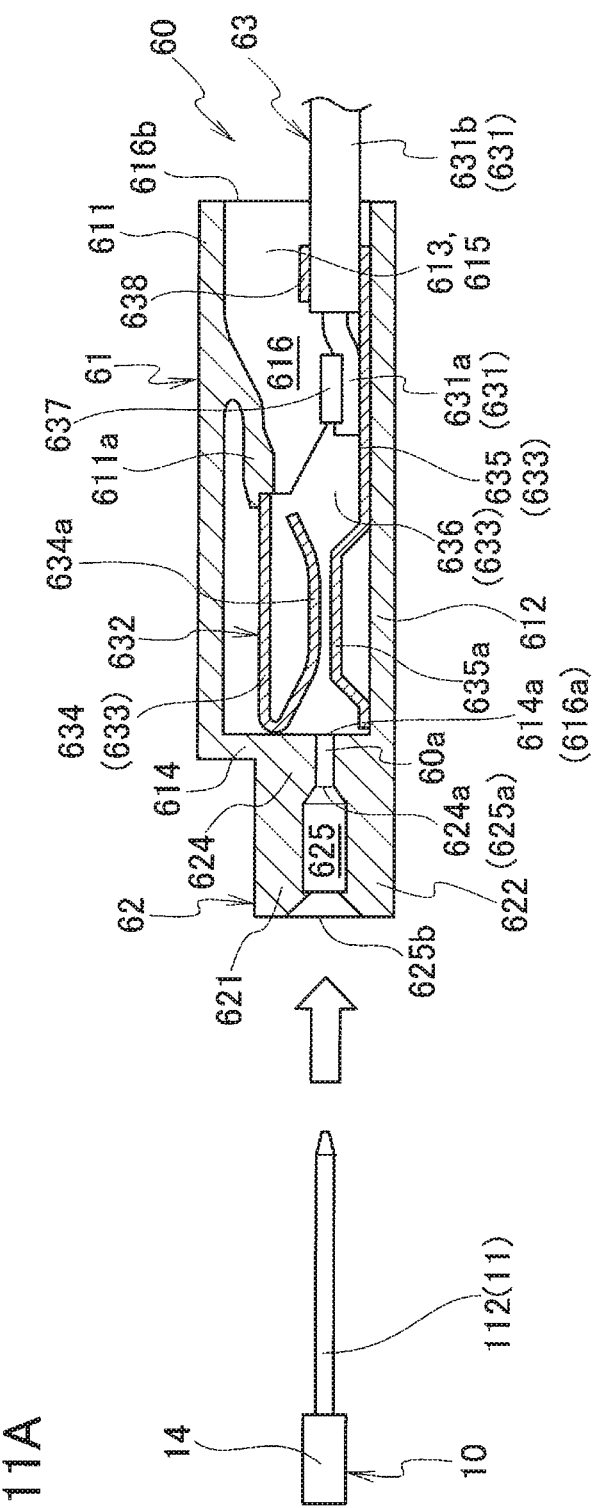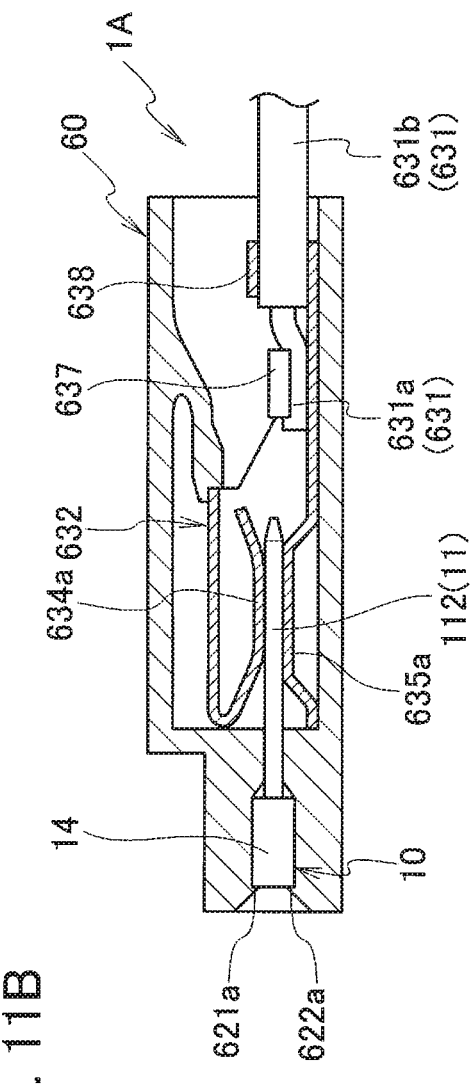

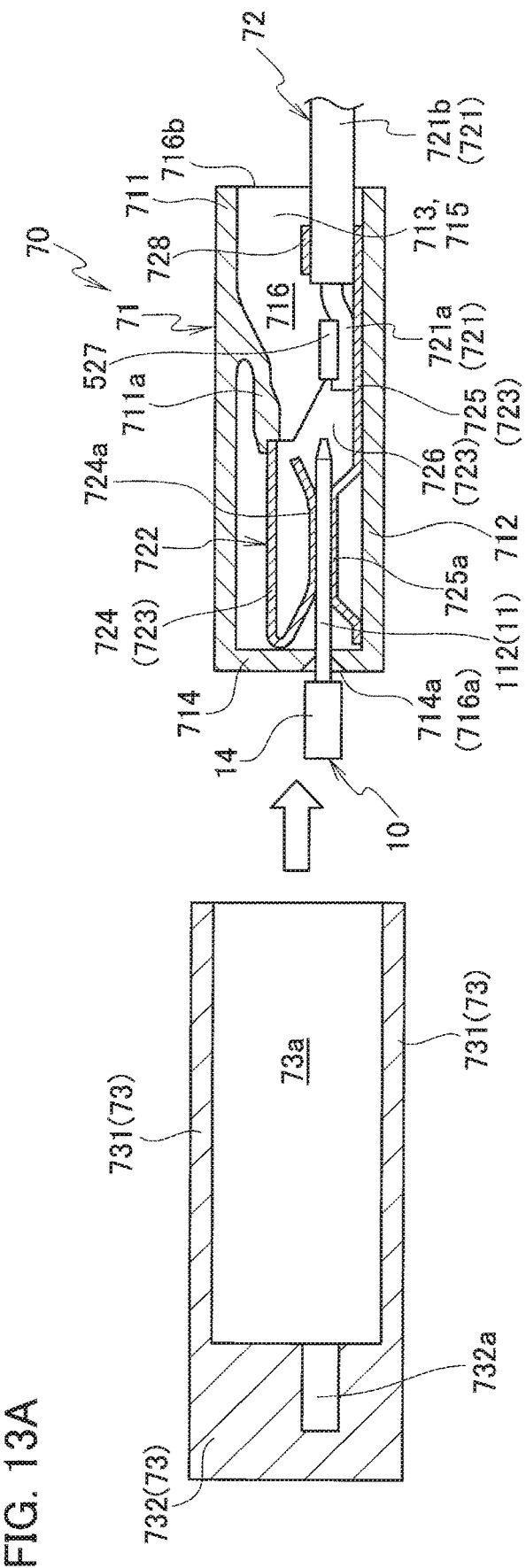
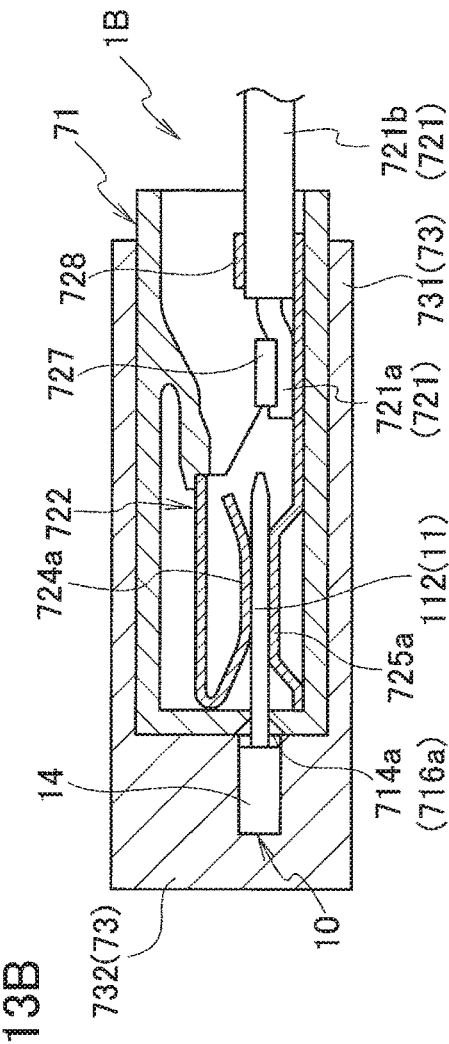
FIG. 13A
FIG. 13B

OIL TEMPERATURE SENSOR

CROSS REFERENCE TO RELATED APPLICATION

This application is based upon and claims the benefit of priority from the prior Japanese Patent Application No. 2018-115167, filed on Jun. 18, 2018, the entire contents of which are incorporated herein by reference.

BACKGROUND

1. Technical Field

The present invention relates to an oil temperature sensor.

2. Related Art

An oil temperature sensor using a thermistor that outputs a signal corresponding to the temperature of oil has been known. This kind of oil temperature sensor has been proposed in Patent Literature 1 (Japanese Patent Application Laid-Open Publication No. 2013-044693. In Patent Literature 1, the oil temperature sensor is formed using a thermistor element having a temperature-resistance characteristic in which the resistance value decreases with the increase of temperature. Specifically, the thermistor element includes a temperature-sensitive resistor and a lead wire electrically connected to the temperature-sensitive resistor. The lead wire is electrically connected to a wire harness via a terminal for extracting an output signal from the thermistor element to an external device. With the thermistor element electrically connected to the wire harness, an operating oil temperature or the like of automatic transmission is detected.

SUMMARY

In the related art, however, the lead wire and the temperature-sensitive resistor are mechanically fixed with an adhesive, and furthermore, the terminal crimps the lead wire and the wire harness to electrically connect the lead wire and the wire harness. Therefore, when the thermistor needs to be replaced for some reason such as a case where the thermistor is defective, it is necessary to replace the thermistor as well as the wire harness at the same time.

Thus, the replacement of the thermistor is not easy in the related art.

It is an object of the present invention to provide an oil temperature sensor capable of replacing a thermistor more easily.

According to an embodiment, there is provided an oil temperature sensor, including: a sensor body that detects a temperature of oil; and a housing in which a space is formed and detachably fitted to an opponent fitting body, wherein the sensor body includes a thermistor, a resin mold portion in which the thermistor is buried, a first lead frame including a first buried portion on which one end of the thermistor is mounted and which is buried in the resin mold portion, and a first terminal portion provided continuously from the first buried portion and exposed from the resin mold portion, and a second lead frame including a second buried portion on which the other end of the thermistor is mounted and which is buried in the resin mold portion, and a second terminal portion provided continuously from the second buried portion and exposed from the resin mold portion, the second lead frame being arranged apart from the first lead frame, and the sensor body is fixed to the housing in a manner that the resin mold portion is buried and the first terminal portion and the second terminal portion are partially exposed to the space.

According to an embodiment, there is provided an oil temperature sensor, including: a sensor body that detects a temperature of oil; and a housing including a pair of spaces in which a pair of cable-attached terminals each including a cable and a terminal portion connected to a conductor of the cable is stored, wherein the sensor body includes a thermistor, a resin mold portion in which the thermistor is buried, a first lead frame including a first buried portion on which one end of the thermistor is mounted and which is buried in the resin mold portion, and a first terminal portion provided continuously from the first buried portion and exposed from the resin mold portion, and a second lead frame including a second buried portion on which the other end of the thermistor is mounted and which is buried in the resin mold portion, and a second terminal portion provided continuously from the second buried portion and exposed from the resin mold portion, the second lead frame being arranged apart from the first lead frame, the housing includes a sensor-body-side housing communicating with the pair of spaces and including a sensor body storing space in which the sensor body is removably stored, and with the sensor body stored in the sensor body storing space, the first terminal portion is electrically connected to a terminal portion of one of the cable-attached terminals and the second terminal portion is electrically connected to a terminal portion of the other cable-attached terminal.

According to an embodiment, there is provided an oil temperature sensor, including: a sensor body that detects a temperature of oil; and a connector unit including a pair of cable-attached terminals each including a cable and a terminal portion connected to a conductor of the cable, and a housing including a pair of spaces in which the pair of cable-attached terminals is stored, wherein the sensor body includes a thermistor, a resin mold portion in which the thermistor is buried, a first lead frame including a first buried portion on which one end of the thermistor is mounted and which is buried in the resin mold portion, and a first terminal portion provided continuously from the first buried portion and exposed from the resin mold portion, and a second lead frame including a second buried portion on which the other end of the thermistor is mounted and which is buried in the resin mold portion, and a second terminal portion provided continuously from the second buried portion and exposed from the resin mold portion, the second lead frame being arranged apart from the first lead frame, each of the pair of spaces includes a terminal insertion port into which the first terminal portion or the second terminal portion is inserted, the sensor body is removably held by the connector unit in a manner that the first terminal portion is inserted from the terminal insertion port in the space in which one of the cable-attached terminals is stored and detachably latched on the terminal portion, and the second terminal portion is inserted from the terminal insertion port in the space in which the other cable-attached terminal is stored and detachably latched on the terminal portion, and with the sensor body held by the connector unit, a cover covering a portion of the sensor body exposed to the outside of the connector unit is detachably attached to the housing.

The first buried portion may include a first recess which is opened toward the second buried portion and in which one end of the thermistor is mounted, and the second buried portion may include a second recess at a position facing the first recess, the second recess being opened toward the first buried portion and the other end of the thermistor being mounted in the second recess.

The first recess may be formed to be stepwise so that a depth of the first recess becomes deeper toward the second recess, and the second recess may be formed to be stepwise so that a depth of the second recess becomes deeper toward the first recess.

According to an embodiment, an oil temperature sensor capable of replacing a thermistor more easily is provided.

BRIEF DESCRIPTION OF DRAWINGS

FIG. 11A is a cross-sectional view schematically illustrating the oil temperature sensor according to the second embodiment before the sensor body is stored in the housing;

FIG. 11B is a cross-sectional view schematically illustrating the oil temperature sensor according to the second embodiment after the sensor body is stored in the housing;

FIG. 13A is a cross-sectional view schematically illustrating the oil temperature sensor according to the third embodiment before the connector unit and the cover are fitted each other;

FIG. 13B is a cross-sectional view schematically illustrating the oil temperature sensor according to the third embodiment after the connector unit and the cover over are fitted each other.

DETAILED DESCRIPTION

Figure 1:
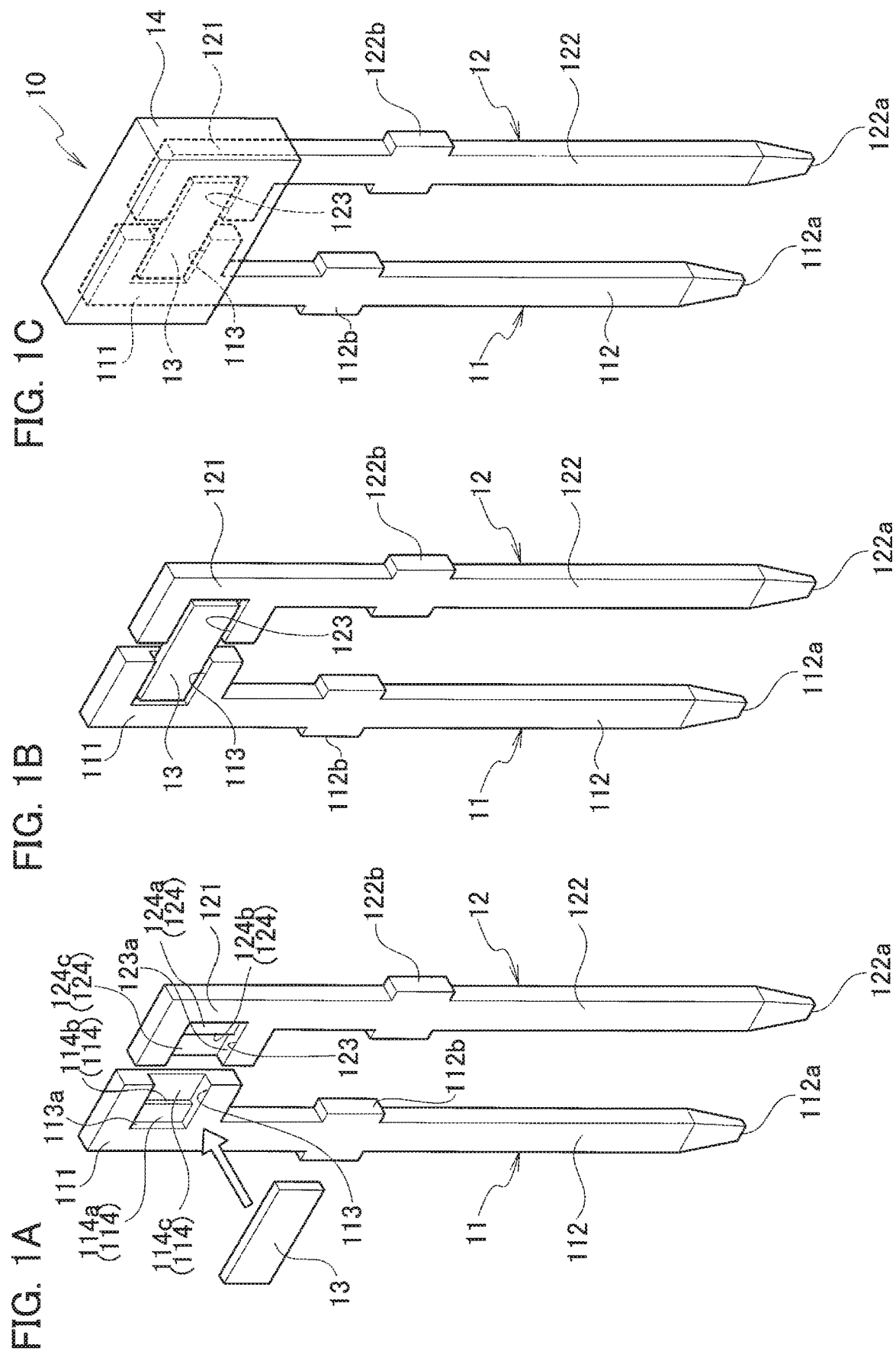
FIG. 1A is a perspective view schematically illustrating an example structure of a sensor body according to a first embodiment before a thermistor is mounted on a lead frame.
FIG. 1B is a perspective view schematically illustrating an example structure of the sensor body according to the first embodiment when the thermistor is mounted on the lead frame.
FIG. 1C is a perspective view schematically illustrating an example structure of the sensor body according to the first embodiment in which the sensor body is illustrated.

Hereinafter, embodiments of the present invention will be described in detail with reference to the accompanying drawings. In the following, an oil temperature sensor which detects the temperature of oil used in a motor vehicle, such as an automatic transmission fluid (ATF) flowing through an automatic transmission, is described as an example. To detect the temperature of the ATF, the temperature of the ATF detected by the oil temperature sensor is output to an electronic control unit (ECU). The detected temperature of the ATF is used for transmission control of the ECU. Specifically, the ECU controls shock reduction of gearshift, optimal gear selection corresponding to traveling conditions, fuel efficiency improvement, and so on in accordance with the detected temperature of the ATF.

Similar components are included in a plurality of embodiments described below. The same reference numerals are given to such similar components and their descriptions are not repeated.

First Embodiment

An oil temperature sensor 1 according to the present embodiment includes a sensor body 10 that detects the temperature of oil.

As illustrated in FIGS. 1A to 1C, the sensor body 10 includes a first lead frame 11 and a second lead frame 12 which is arranged apart from the first lead frame 11. The first lead frame 11 and the second lead frame 12 are conductive, and may be formed using, for example, a metal plate.

The first lead frame 11 and the second lead frame 12 are electrically connected via a thermistor 13 that outputs a signal corresponding to the temperature of the oil. Specifically, one end of the thermistor 13 is mounted on the first lead frame 11, while the other end of the thermistor 13 is mounted on the second lead frame 12, thus electrically connecting the first lead frame 11 and the second lead frame 12 via the thermistor 13.

The sensor body 10 also includes a resin mold portion 14. The resin mold portion 14 covers the thermistor 13 and the portion where the first lead frame 11 and the second lead frame 12 are mounted on the thermistor 13 (see FIG. 1C).

In the present embodiment, the thermistor 13 is entirely covered with the resin mold portion 14, as illustrated in FIG. 1C. On the other hand, the first lead frame 11 and the second lead frame 12 are covered with the resin mold portion 14 only partially (near the portion where the thermistor 13 is mounted).

Thus, in the present embodiment, the first lead frame 11 includes a first buried portion 111 on which one end of the thermistor 13 is mounted and which is buried in the resin mold portion 14, and a first terminal portion 112 provided continuously from the first buried portion 111 and exposed from the resin mold portion 14.

Similarly, the second lead frame 12 includes a second buried portion 121 on which the other end of the thermistor 13 is mounted and which is buried in the resin mold portion 14, and a second terminal portion 122 provided continuously from the second buried portion 121 and exposed from the resin mold portion 14.

In the present embodiment, the first lead frame 11 and the second lead frame 12 are arranged substantially in parallel to each other in a manner that the first buried portion 111 faces the second buried portion 121 and the first terminal portion 112 faces the second terminal portion 122. The first lead frame 11 and the second lead frame 12 are each formed to have a wider end on the side of the buried portion than on the side of the terminal portion. Specifically, in the plan view, the end portions of the first lead frame 11 and the second lead frame 12 are shaped to protrude toward the end portions of the opponent buried portions. In other words, the facing distance between the first lead frame 11 and the second lead frame 12 is shorter at the end portions on the side of the buried portions than at the end portions on the side of the terminal portions.

The thermistor 13 is mounted on the end portions on the side of the buried portions where the facing distance is short. As described above, the facing distance is decreased only at the portion where the thermistor 13 is mounted, while ensuring the insulation distance between the terminals, to facilitate mounting of the thermistor 13. Preferably, the facing distance at the portion where the thermistor 13 is mounted is set so as to prevent short-circuiting between the two lead frames due to melted solder during mounting, while preventing insufficient mounting due to outflow of the solder.

Further, a recess is formed in both first and second buried portions 111 and 121, and the thermistor 13 is mounted in the recess in the present embodiment.

Specifically, the first buried portion 111 includes a first recess 113 which is opened toward the second buried portion 121 and in which one end of the thermistor 13 is mounted. The second buried portion 121 includes a second recess 123 located at a portion facing the first recess 113. The second recess 123 is opened toward the first buried portion 111 and in which the other end of the thermistor 13 is mounted.

By mounting the thermistor 13 in the recess configured as described above, the solder flow can be stopped by inner surfaces 113*a* and 123*a* of each recess when the thermistor 13 is soldered. The inner surfaces 113*a* and 123*a* can also prevent positional deviation of the thermistor 13.

In the present embodiment, the first recess 113 is formed to be stepwise so that its depth becomes deeper toward the second recess 123. The second recess 123 is formed to be stepwise so that its depth becomes deeper toward the first recess 113.

Figure 2:
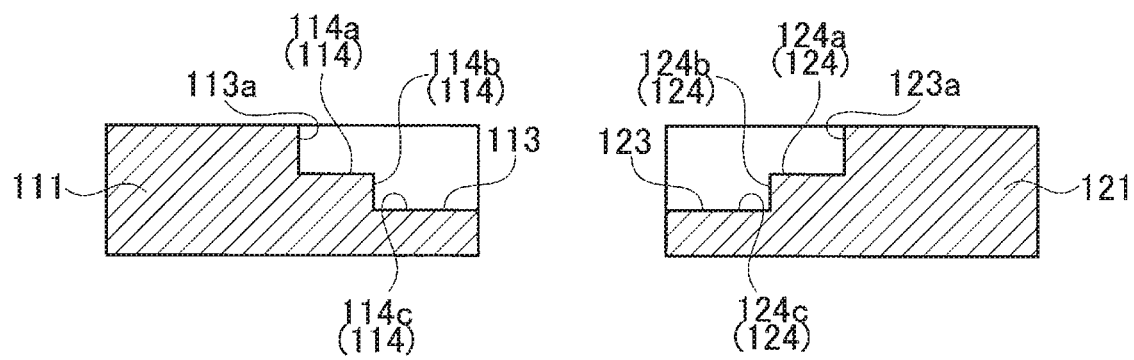
FIG. 2 is a cross-sectional view schematically illustrating a recess formed in the lead frame according to the first embodiment.

Specifically, as illustrated in FIG. 2, the first recess 113 includes a near-side mounting surface 114*a* located away from the second recess 123 and near the opening of the first recess 113 (open side in the plate thickness direction), and having a shallow depth from the opening. The first recess 113 also includes a far-side mounting surface 114*c* located closer to the second recess 123 and on the far side of the first recess 113, and having a deep depth. Further, the first recess 113 includes a stepped surface 114*b* connecting the near-side mounting surface 114*a* and the far-side mounting surface 114*c*. Thus, the first recess 113 includes the stepped portion 114 formed by the near-side mounting surface 114*a*, the far-side mounting surface 114*c*, and the stepped surface 114*b*.

Similarly, the second recess 123 includes a near-side mounting surface 124*a* located away from the first recess 113 and near the opening of the second recess 123 (open side in the plate thickness direction), and having a shallow depth from the opening. The second recess 123 also includes a far-side mounting surface 124*c* located closer to the first recess 113 and on the far side of the second recess 123, and having a deep depth. Further, the second recess 123 includes a stepped surface 124*b* connecting the near-side mounting surface 124*a* and the far-side mounting surface 124*c*. Thus, the second recess 123 includes the stepped portion 124 formed by the near-side mounting surface 124*a*, the far-side mounting surface 124*c*, and the stepped surface 124*b*.

Figure 3A:
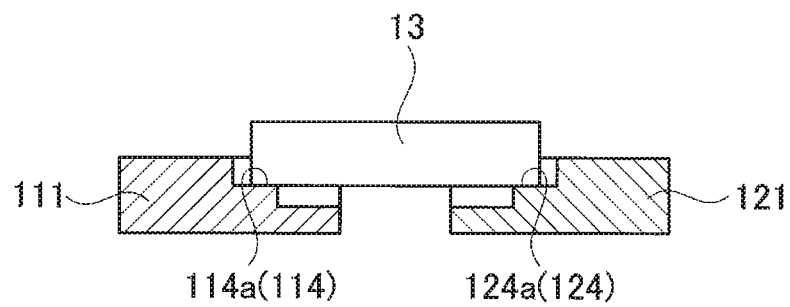
FIG. 3A is a cross-sectional view schematically illustrating a relatively large thermistor mounted in the recess formed in the lead frame according to the first embodiment.
Figure 3B:
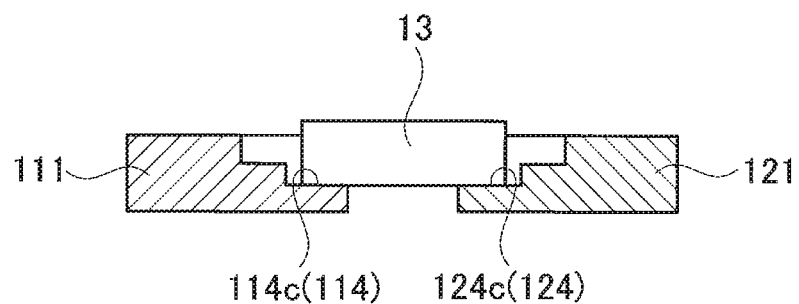
FIG. 3B is a cross-sectional view schematically illustrating a relatively small thermistor mounted in the recess formed in the lead frame according to the first embodiment.

As described above, in the present embodiment, each lead frame has the two-stepped recess. With this structure, a relatively large thermistor 13 can be mounted on the upper wider stage of the recess, and a relatively small thermistor can be mounted on the lower narrower stage (see FIGS. 3A and 3B). In other words, by forming the step in the recess, the mounting location can be appropriately selected in accordance with the size of the thermistor 13.

As the thermistor 13 mounted on the pair of lead frames 11 and 12, a negative temperature coefficient (NTC) thermistor, for example, whose resistance decreases with the increase of the temperature can be used. A positive temperature coefficient (PTC) thermistor whose resistance increases with the increase of the temperature can also be used. It is also possible to use a critical temperature resistor (CTR) thermistor whose resistance decreases sharply above a certain temperature.

Further, in the present embodiment, a surface mount type (chip-like thermistor) is used as the thermistor 13.

A conventionally known thermistor can be used as the thermistor 13.

Then, the thermistor 13 is mounted on the first lead frame 11 and the second lead frame 12 by soldering. In this way, by mounting the surface mount type thermistor 13 using solder, there is no need to access from the rear side when connecting the thermistor 13 to the lead frame, and the thermistor 13 can be connected to the lead frame more easily.

Further, as described above, in the present embodiment, the thermistor 13 and the portion where the thermistor 13 is mounted on the first and second lead frames 11 and 12 are entirely covered with the resin mold portion 14. In other words, the sensor body 10 is formed in a manner that only the first terminal portion 112 and the second terminal portion 122, each having a function as a terminal, protrude outward.

As described above, the thermistor 13 is protected by covering the thermistor 13 with the resin mold portion 14.

Figure 4:
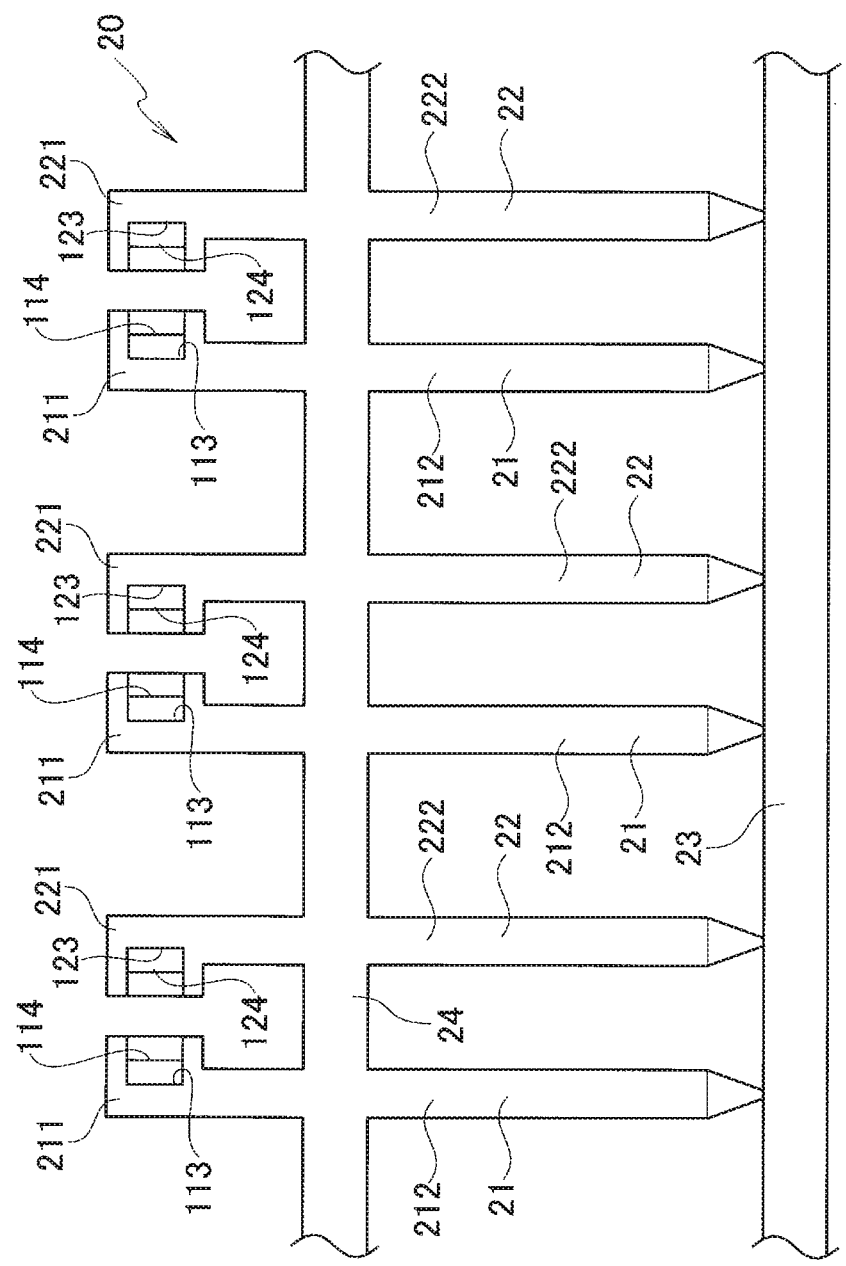
FIG. 4 is a plan view schematically illustrating a lead frame material according to the first embodiment.

The sensor body 10 can be manufactured, for example, using a lead frame material 20 illustrated in FIG. 4.

Hereinafter, an example method of manufacturing the sensor body 10 is described by referring to FIGS. 4 to 7.

The lead frame material 20 connects a scheduled first-terminal-portion forming portion 212 where a first terminal portion 112 is to be formed and a scheduled second-terminal-portion forming portion 222 where a second terminal portion 122 is to be formed via connecting portions 23 and 24 when the sensor body 10 is manufactured. The lead frame material 20 can be made of a metal plate by press-forming. The present embodiment illustrates the lead frame material 20 in which a plurality of frame portions each forming a pair (first lead frame portions 21 and second lead frame portions 22) are arranged in parallel.

In the manufacturing method of the sensor body 10 described below, it is necessary to first prepare the lead frame material 20 by, for example, manufacturing the lead frame material 20.

In other words, the method of manufacturing the sensor body 10 includes a material preparation step of preparing the lead frame material 20. In the material preparation step, the lead frame material 20 is prepared. The lead frame material 20 includes the scheduled first-terminal-portion forming portion 212 of the first lead frame portion 21 and the scheduled second-terminal-portion forming portion 222 of the second lead frame portion 22, and the scheduled first- and second-terminal-portion forming portions 212 and 222 are connected via the connecting portions 23 and 24 (see FIG. 5A).

Figure 5A:
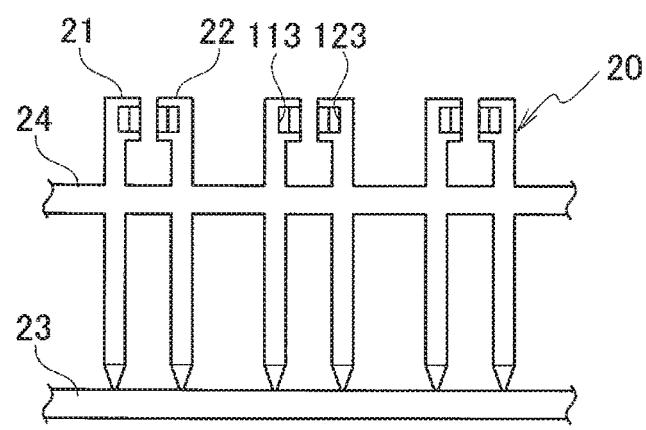
FIG. 5A is a plan view schematically illustrating an example method of manufacturing a sensor body according to the first embodiment in which a lead frame material is illustrated.
Figure 5B:
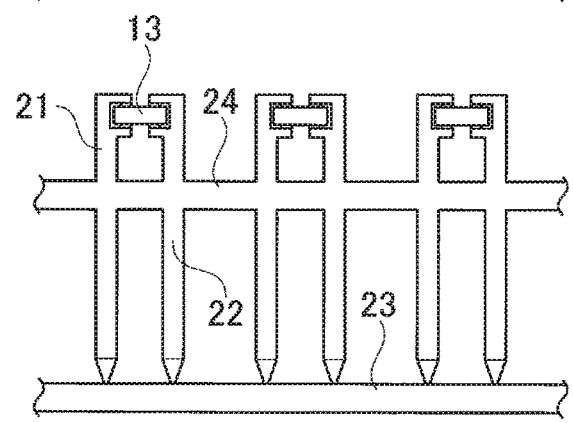
FIG. 5B is a plan view schematically illustrating the example method of manufacturing the sensor body according to the first embodiment in which a thermistor is mounted on the lead frame material.

After preparing the lead frame material 20, the thermistors 13 are mounted on predetermined portions of the lead frame material 20 (see FIG. 5B). In the present embodiment, each thermistor 13 is mounted on the portion of the lead frame portions (the first lead frame portion 21 and the second lead frame portion 22) where the resin mold is to be formed (a first portion 211 where the resin mold is to be formed and a second portion 221 where the resin mold is to be formed). Specifically, the recesses (the first recess 113 and the second recess 123) are formed in the portion where the resin mold is to be formed (the first portion 211 where the resin mold is to be formed and the second portion 221 where the resin mold is to be formed). The thermistor 13 is mounted on the lead frame portions (the first lead frame portion 21 and the second lead frame portion 22) as being mounted in the recesses (the first recess 113 and the second recess 123).

Thus, the method of manufacturing the sensor body 10 includes a thermistor mounting step. In the thermistor mounting step, one end of the thermistor 13 is mounted on the first portion 211 of the first lead frame portion 21 where the resin mold is to be formed, while the other end of the thermistor 13 is mounted on the second portion 221 of the second lead frame portion 22 where the resin mold is to be formed.

Figure 5C:
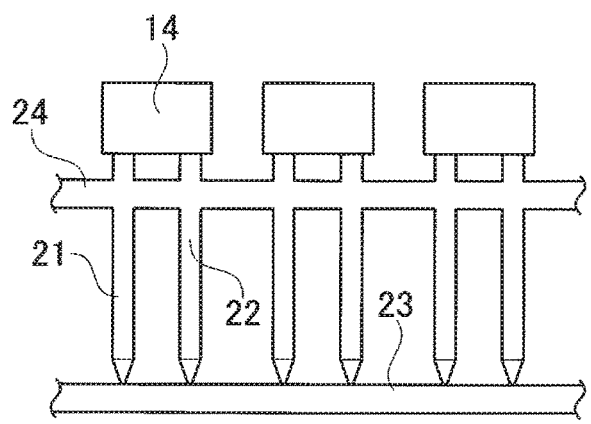
FIG. 5C is a plan view schematically illustrating the example method of manufacturing the sensor body according to the first embodiment when a resin mold portion is formed.
Figure 5D:
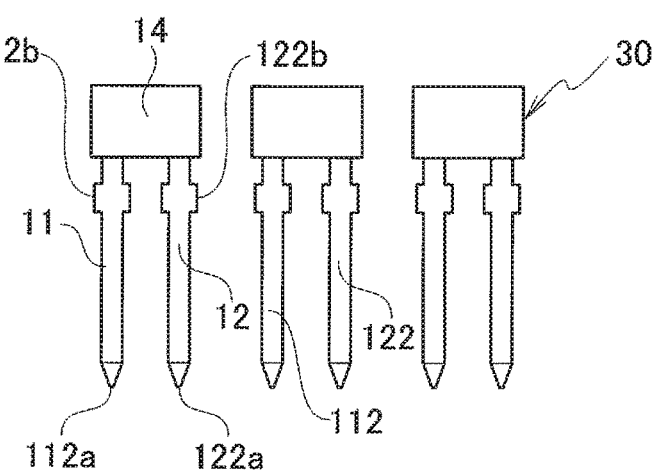
FIG. 5D is a plan view schematically illustrating the example method of manufacturing the sensor body according to the first embodiment when the sensor body is formed.

With the thermistor 13 mounted on the lead frame portions (the first lead frame portion 21 and the second lead frame portion 22), the first portion 211 where the resin mold is to be formed, the second portion 221 where the resin mold is to be formed, and the thermistor 13 are subjected to molding (see FIG. 5C).

Thus, the method of manufacturing the sensor body 10 includes a molding step. In the molding step, the first portion 211 where the resin mold is to be formed, the second portion 221 where the resin mold is to be formed, and the thermistor 13 are molded, with the thermistor 13 mounted on the first portion 211 where the resin mold is to be formed and the second portion 221 where the resin mold is to be formed.

Accordingly, the resin mold portion 14 that covers the first portion 211 where the resin mold is to be formed, the second portion 221 where the resin mold is to be formed, and the thermistor 13 is formed.

In the present embodiment, the resin mold portion 14 is made of epoxy resin by transfer molding. By molding the thermistor 13 with the epoxy resin by transfer molding, it is possible to prevent application of excessive molding pressure to the thermistor 13 when the resin mold portion 14 is formed.

The present embodiment can further prevent application of the excessive molding pressure to the thermistor 13 when the resin mold portion 14 is formed.

Figure 6A:
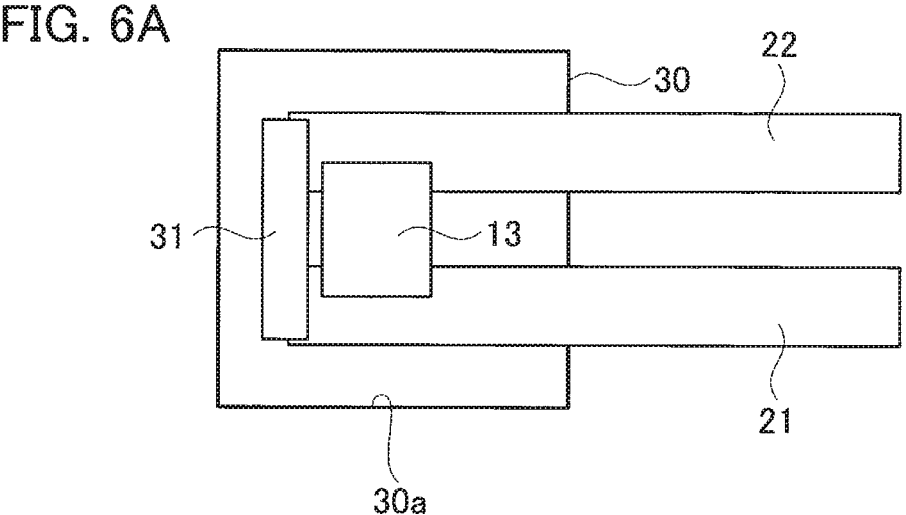
FIG. 6A is a plan view schematically illustrating an example method of forming the resin mold portion according to the first embodiment when a movable protective wall is arranged in a cavity of a mold.
Figure 6B:
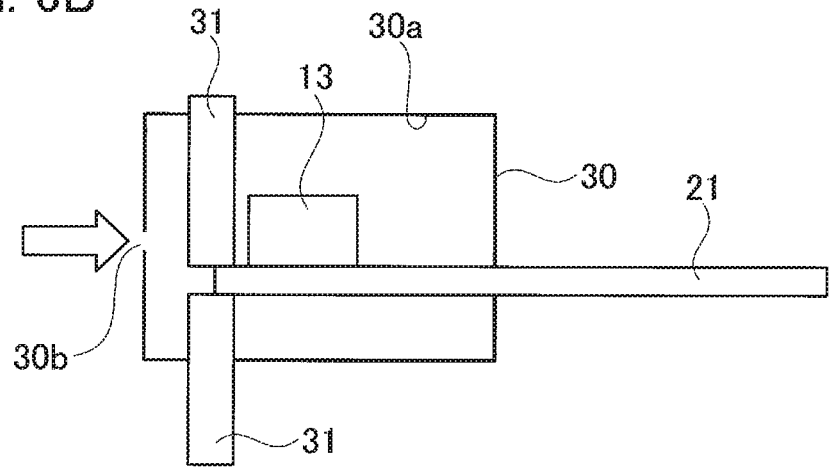
FIG. 6B is a side view schematically illustrating the example method of forming the resin mold portion according to the first embodiment when the movable protective wall is arranged in a cavity of a mold.
Figure 7:
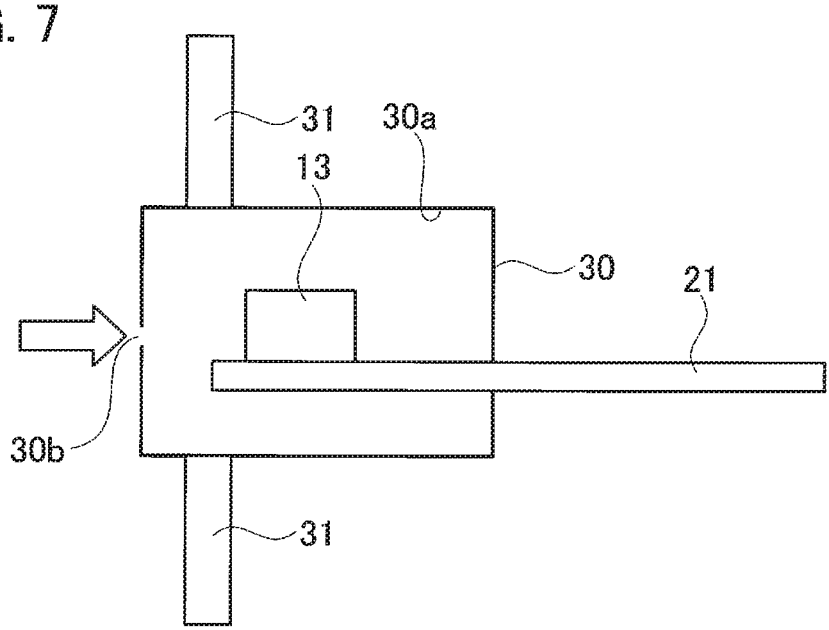
FIG. 7 is a side view schematically illustrating the example method of forming the resin mold portion according to the first embodiment when the movable protective wall is moved to the outside of the cavity of the mold.

Specifically, as illustrated in FIGS. 6A, 6B, and 7, the first portion 211 where the resin mold is to be formed and the second portion 221 where the resin mold is to be formed are arranged, with the thermistor 13 mounted on the first and second portions 211 and 221, in a cavity 30a of a mold 30. In an initial state, a protective wall 31 is interposed between an injection port 30b and the thermistor 13 when resin (epoxy resin) is injected into the cavity 30a from the injection port 30b. With this structure, the resin injected from the injection port 30b does not directly contact the thermistor 13. The protective wall 31 is slidably attached to the mold 30. When a certain amount of resin is injected into the cavity 30a, the protective wall 31 is slid and taken out to fill the cavity 30a with the resin. With this structure, the molding pressure applied to the thermistor 13 in formation of the resin mold portion 14 can be decreased.

After the resin mold portion 14 is formed, the connecting portions 23 and 24 are cut, the connecting portions 23 and 24 connecting the scheduled first-terminal-portion forming portion 212 of the first lead frame portion and the scheduled second-terminal-portion forming portion 222 of the second lead frame portion 22.

Thus, the method of manufacturing the sensor body 10 includes a cutting step. In the cutting step, the connecting portions 23 and 24 are cut after the resin mold portion 14 is formed to separate the scheduled first-terminal-portion forming portion 212 from the scheduled second-terminal-portion forming portion 222. The sensor body 10 is formed by separating the scheduled first-terminal-portion forming portion 212 from the scheduled second-terminal-portion forming portion 222.

At this time, cut marks which are left on the first terminal portion 112 and the second terminal portion 122 which are made when the connected parts are cut.

In the present embodiment, the connecting portions include the first connecting portion 23 that connects the scheduled first-terminal-portion forming portion 212 and the scheduled second-terminal-portion forming portion 222. The connecting portions also include the second connecting portion 24 that connects the scheduled first-terminal-portion forming portion 212 and the scheduled second-terminal-portion forming portion 222 at a location different from location of the first connecting portion 23.

Accordingly, the first and second connecting portions 23 and 24 are cut in the cutting step.

As described above, when the lead frame material 20 connected by the two connecting portions 23 and 24 is used, tip-side cut marks 112a and 122a and root-side cut marks 112b and 122b are formed on the first terminal portion 112 and the second terminal portion 122 (see FIGS. 1A to 1C).

In manufacturing the sensor body 10, the scheduled first-terminal-portion forming portion 212 and the scheduled second-terminal-portion forming portion 222 are connected via the two connecting portions 23 and 24 until formation of the resin mold portion 14 is completed. This prevents relative movement between the scheduled first-terminal-portion forming portion 212 and the scheduled second-terminal-portion forming portion 222.

The oil temperature sensor 1 is formed using the sensor body 10 manufactured in this manner.

Figure 8:
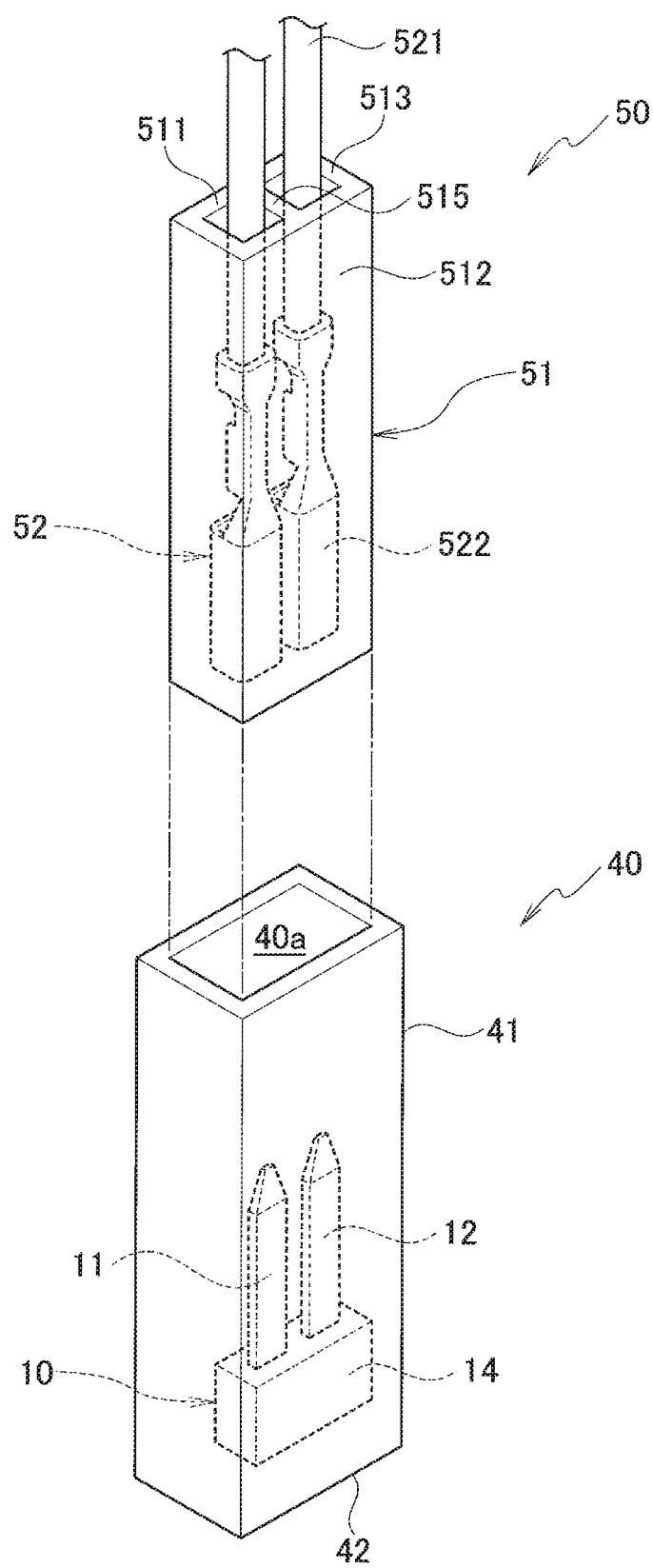
FIG. 8 is a perspective view schematically illustrating an oil temperature sensor and an opponent fitting body according to the first embodiment before the oil temperature sensor and the opponent fitting body are fitted each other.
Figure 9A:
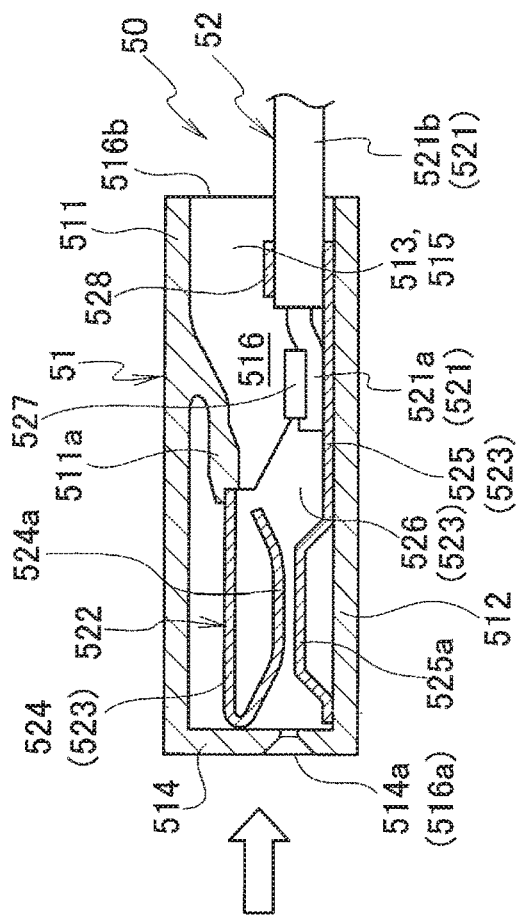
FIG. 9A is a cross-sectional view schematically illustrating the oil temperature sensor and the opponent fitting body according to the first embodiment before the oil temperature sensor and the opponent fitting body are fitted each other.
Figure 9B:
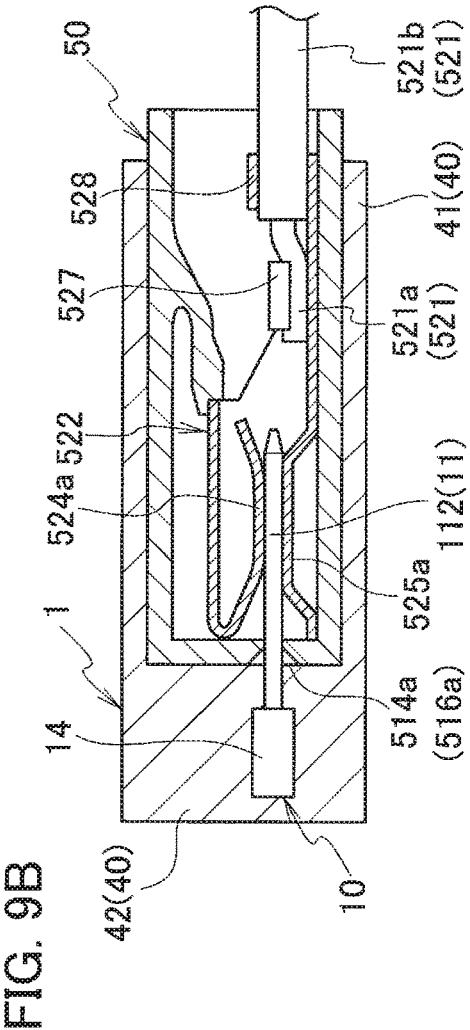
FIG. 9B is a cross-sectional view schematically illustrating the oil temperature sensor and the opponent fitting body according to the first embodiment when the oil temperature sensor and the opponent fitting body are fitted each other.

In the present embodiment, as illustrated in FIGS. 8, 9A, and 9B, the oil temperature sensor 1 includes a housing 40 in which space 40a is formed and which is detachably fitted to an opponent connector (opponent fitting body) 50.

The housing 40 is made of a material such polyphenylene sulfide (PPS), 6,6 nylon, or the like.

In the present embodiment, the resin mold portion 14 of the sensor body 10 is buried in the housing 40 when the housing 40 that is detachably fitted to the opponent connector 50 is formed. In other words, the sensor body 10 is formed by insert molding in the housing 40 in the present embodiment.

At this time, the sensor body 10 is fixed to the housing 40 with portions including the tips of the first terminal portion 112 and the second terminal portion 122 being exposed to the space 40a.

Specifically, the housing 40 includes a peripheral wall 41 extending in a front-rear direction, and a rear wall 42 provided continuously from the rear end of the peripheral wall 41 to close a rear opening of the housing 40. Thus, the space 40a that opens forward (on the side facing the opponent connector) is defined by the inner surface of the peripheral wall 41 and the inner surface of the rear wall 42.

Then, the sensor body 10 is insert-molded in the housing 40 such that the entire resin mold portion 14 is buried in the rear wall 42 and that the tips of the first terminal portion 112 and the second terminal portion 122 project forward in the front-rear direction.

With this structure, the oil temperature sensor 1 including the sensor body 10 and the housing 40 is formed.

The oil temperature sensor 1 is used as being fitted to the opponent connector (opponent fitting body) 50 which is connected to a cable for extracting an output signal from the thermistor 13 to an external device (e.g., ECU).

Next, the structure of the opponent connector 50 is described.

The opponent connector 50 includes a connector housing 51 as illustrated in FIGS. 8, 9A, and 9B.

The connector housing 51 is formed in a substantially rectangular parallelepiped shape, as illustrated in FIGS. 8, 9A, and 9B, and is made of, for example, a synthetic resin. In addition, the connector housing 51 includes a top wall 511, a bottom wall 512, and a pair of side walls 513 and 513, each provided continuously from end portions of the top wall 511 and the bottom wall 512, respectively, in the width direction. Further, the connector housing 51 includes a front wall 514 provided continuously from the front ends of the top wall 511, the bottom wall 512, and the side walls 513 and 513.

In the connector housing 51, a plurality of (two in the present embodiment) terminal storing spaces 516 which are divided by a partition wall 515 and opened at both ends are formed.

A terminal insertion port 516a into which the first terminal portion 112 or the second terminal portion 122 is inserted is formed on the side of each terminal storing space 516 facing the oil temperature sensor 1. In the present embodiment, a through hole 514a formed in the front wall 514 is provided as the terminal insertion port 516a.

A cable outlet 516b is formed on the side of the terminal storing space 516 opposite to the terminal insertion port 516a, and a terminal portion 522 of the cable-attached terminal 52 is inserted into the terminal storing space 516 from the cable outlet 516b. The terminal portion 522 of one cable-attached terminal 52 is stored in one terminal storing space 516.

In the present embodiment, an elastically deformable latching piece 511a is formed on the lower surface (inner surface) of the top wall 511 so as to protrude toward the terminal storing space 516. By latching a top wall 524 of the terminal portion 522 stored in the terminal storing space 516 on the latching piece 511a, the cable-attached terminal 52 stored in the terminal storing space 516 is restricted (positioned).

The cable-attached terminal 52 includes a substantially columnar cable 521 and a terminal portion 522 electrically connected to a conductor 521a of the cable 521.

The cable 521 includes the conductor 521a and an insulating sheath 521b covering the outer periphery of the conductor 521a. The terminal portion 522 is connected to a portion (exposed portion) of the conductor 521a which is not covered by the sheath 521b. For example, the conductor 521a can be made of aluminum or an aluminum-based alloy.

The terminal portion 522 includes a terminal body 523 having a substantially box shape into which the first terminal portion 112 or the second terminal portion 122 is inserted, and a conductor crimping portion (cable connecting portion) 527 which is crimped to the conductor 521a of the cable 521 and electrically connected to the conductor 521a. Further, the terminal portion 522 includes a cable holding portion (cable connecting portion) 528 which is crimped to the sheath 521b of the cable 521 to hold the cable 521.

The terminal body 523 also includes the top wall 524, a bottom wall 525, and a pair of side walls 526 and 526. An elastic bending portion 524a is formed on the top wall 524, and a projection 525a that protrudes toward the elastic bending portion 524a is formed on the bottom wall 525. The first terminal portion 112 or the second terminal portion 122 is inserted into the gap between the elastic bending portion 524a and the projection 525a. With this structure, the first terminal portion 112 or the second terminal portion 122 is sandwiched between the elastic bending portion 524a and the projection 525a and held in an electrically connected state.

In the present embodiment, the oil temperature sensor 1 and the opponent connector 50 are detachably fitted. In other words, the housing 40 and the connector housing 51 are detachably fitted, and the first terminal portion 112 and the second terminal portion 122 are detachably latched on the terminal portions 522 and 522.

A conventional structure can be adopted as a structure for detachably fitting the oil temperature sensor 1 and the opponent connector 50.

As described above, the oil temperature sensor 1 according to the present embodiment includes the sensor body 10 for detecting the temperature of the oil, and the housing 40 in which the space 40a is formed and detachably fitted to the opponent connector (opponent fitting body) 50.

The sensor body 10 includes the thermistor 13 and the resin mold portion 14 in which the thermistor 13 is buried.

The sensor body 10 includes the first lead frame 11 on which one end of the thermistor 13 is mounted, and the second lead frame 12 arranged apart from the first lead frame 11 and on which the other end of the thermistor 13 is mounted.

The first lead frame 11 includes the first buried portion 111 on which one end of the thermistor 13 is mounted and which is buried in the resin mold portion 14, and the first terminal portion 112 provided continuously from the first buried portion 111 and exposed from the resin mold portion 14.

The second lead frame 12 includes the second buried portion 121 on which the other end of the thermistor 13 is mounted and which is buried in the resin mold portion 14, and the second terminal portion 122 provided continuously from the second buried portion 121 and exposed from the resin mold portion 14.

The sensor body 10 is fixed in the housing 40 in a state in which the resin mold portion 14 is buried and the first terminal portion 112 and the second terminal portion 122 are exposed partially to the space 40a.

In the present embodiment, the oil temperature sensor 1 is detachably fitted to the opponent connector 50, as described above.

With this structure, the thermistor 13 can be replaced simply by releasing the fitting between the oil temperature sensor 1 and the opponent connector 50 to remove the oil temperature sensor 1 from the opponent connector 50, and replacing the oil temperature sensor 1 with a new oil temperature sensor.

Thus, according to the present embodiment, it is possible to provide the oil temperature sensor 1 capable of replacing the thermistor 13 more easily.

Further, the present embodiment uses the sensor body 10 in which the thermistor 13 mounted on the first and second lead frames 11 and 12 and the portion where the thermistor 13 is mounted are covered with the resin mold portion 14 in advance. With this structure, the thermistor 13 mounted on the first and second lead frames 11 and 12 is protected by the resin mold portion 14. For example, as illustrated in the present embodiment, by insert molding of the housing 40 using the sensor body 10, it is possible to prevent direct application of the molding pressure or the stress of thermal expansion and contraction on the thermistor 13. This prevents damage of the thermistor 13 during insert molding of housing 40 or peeling off the soldered portions between the thermistor 13 and the first and second lead frames 11 and 12.

Further, the sensor body 10 described in the present embodiment can be used in various shapes and types of oil temperature sensors. For example, the oil temperature sensor 1 can be used as being connected to various types of connectors by changing the shape of the housing 40 of the oil temperature sensor 1 according to the shape of the opponent connector. Since there is no need to change the shape of the opponent connector according to the shape of the oil temperature sensor 1, any existing connector can be used as the opponent connector, thus providing versatility to the oil temperature sensor 1.

Further, in the present embodiment, the first buried portion 111 includes the first recess 113 which is opened toward the second buried portion 121 and in which one end of the thermistor 13 is mounted. The second buried portion 121 includes the second recess 123 at a position facing the first recess 113, the second recess 123 being opened toward the first buried portion 111 and in which the other end of the thermistor 13 is mounted.

With the thermistor 13 mounted in the first recess 113 and the second recess 123, the inner surfaces 113a and 123a of these recesses can stop the flow of the solder in soldering of the thermistor 13. This enables soldering of the thermistor 13 to the first and second lead frames 11 and 12 more reliably. Further, the inner surfaces 113a and 123a can prevent positional displacement of the thermistor 13, thus decreasing displacement errors of connection of the thermistor 13.

Further, in the present embodiment, the first recess 113 is formed to be stepwise so that its depth becomes deeper toward the second recess 123, and the second recess 123 is formed to be stepwise so that its depth becomes deeper toward the first recess 113.

With this structure, a relatively large thermistor 13 can be mounted in the shallow and wide recess on the open side, or a relatively small thermistor 13 can be mounted in the deeper and narrow recess on the far side. This allows various sizes of the thermistors 13 can be mounted under more preferable conditions.

Second Embodiment

An oil temperature sensor 1A according to the present embodiment is formed by directly inserting the sensor body 10 illustrated in the first embodiment into a housing 60 of the opponent connector (opponent fitting body) which is connected to a cable for extracting an output signal from the thermistor 13 to an external device.

In other words, the oil temperature sensor 1A includes the sensor body 10 that detects the temperature of oil. Further, the oil temperature sensor 1A includes the housing 60 provided with a pair of spaces 616 in which a pair of cable-attached terminals 63 is stored, each cable-attached terminal 63 including the cable 631 and a terminal portion 632 connected to a conductor 631a of the cable 631.

Further, in the present embodiment, the housing 60 includes a terminal-side housing 61 in which the cable-attached terminals 63 are stored, and a sensor-body-side housing 62 in which the sensor body 10 is directly stored.

The terminal-side housing 61 has substantially the same shape as the connector housing 51 of the opponent connector 50 illustrated in the first embodiment.

Figure 10:
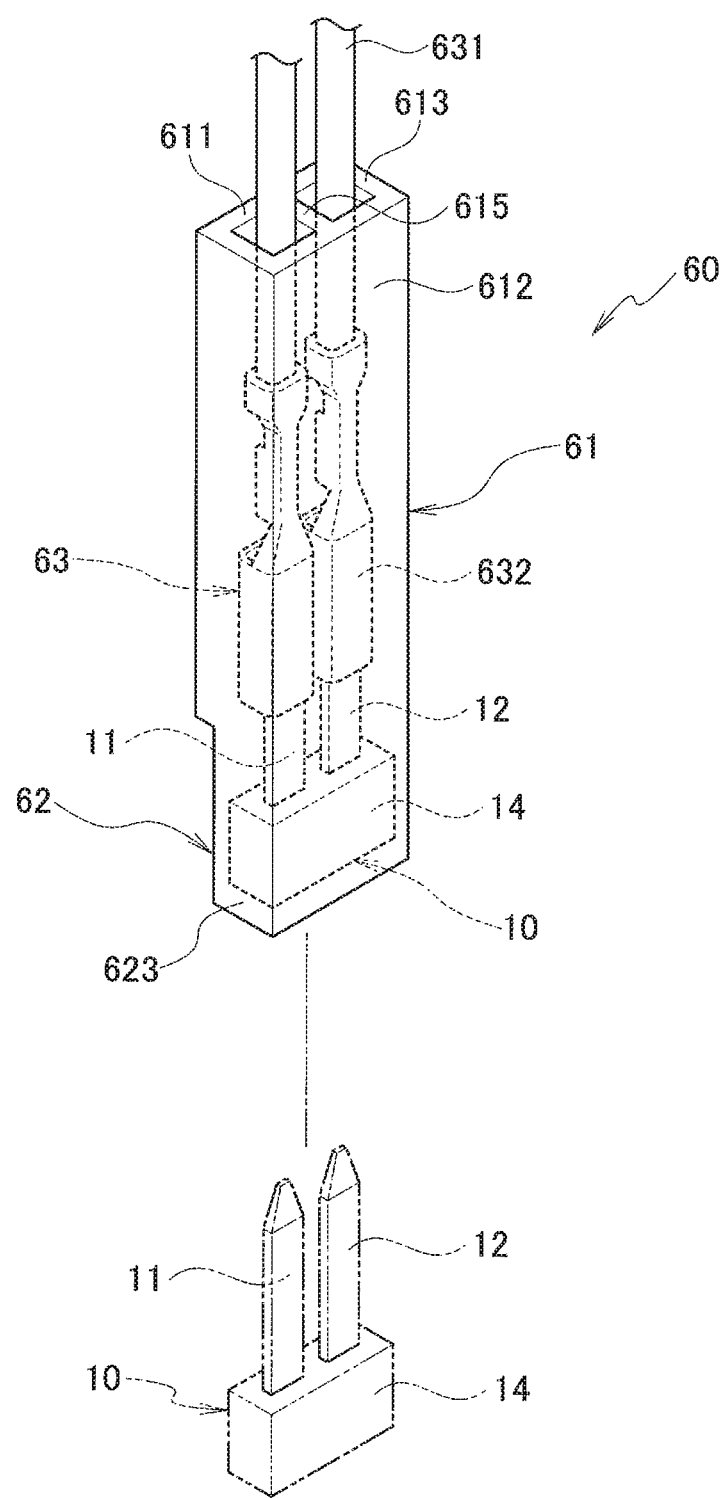
FIG. 10 is a perspective view schematically illustrating an oil temperature sensor according to a second embodiment before a sensor body is stored in a housing.

In other words, the terminal-side housing 61 is formed in a substantially rectangular parallelepiped shape, and is made of, for example, a synthetic resin, as illustrated in FIGS. 10, 11A, and 11B. The terminal-side housing 61 also includes a top wall 611, a bottom wall 612, a pair of side walls 613 and 613, and a front wall 614.

In the terminal-side housing 61, a plurality of (two in the present embodiment) terminal storing spaces 616 which are partitioned by the partition walls 615 and opened at both ends are formed.

A terminal insertion port 616a into which the first terminal portion 112 or the second terminal portion 122 is inserted is formed on the side of each terminal storing space 616 facing the sensor-body-side housing 62. In the present embodiment, the terminal insertion port 616a is provided as a through hole 614a formed in the front wall 614.

Further, a cable outlet 616b is formed on the side opposite to the terminal insertion port 616a of each terminal storing space 616, so that the terminal portion 632 of the cable-attached terminal 63 is inserted into the terminal storing space 616 from the cable outlet 616b. The terminal portion 632 of one cable-attached terminals 63 is stored in one terminal storing space 616.

In the present embodiment, an elastically deformable latching piece 611a is formed on the lower surface (inner surface) of the top wall 611 so as to protrude toward the terminal storing space 616. By latching the top wall 634 of the terminal portion 632 stored in the terminal storing space 616 on the latching piece 611a, the cable-attached terminal 63 stored in the terminal storing space 616 is restricted (positioned).

The cable-attached terminal 63 includes the substantially columnar cable 631 and the terminal portion 632 electrically connected to the conductor 631a of the cable 631.

The cable 631 includes a conductor 631a and an insulating sheath 631b covering the outer periphery of the conductor 631a, and the terminal portion 632 is connected to a portion (exposed portion) of the conductor 631a not covered by the sheath 631b. For example, the conductor 631a can be made of aluminum or an aluminum-based alloy.

The terminal portion 632 includes a terminal body 633 having a substantially box shape into which the first terminal portion 112 or the second terminal portion 122 is inserted, and a conductor crimping portion (cable connecting portion) 637 which is crimped to the conductor 631a of the cable 631 and electrically connected to the conductor 631a. The terminal portion 632 also includes a cable holding portion (cable connecting portion) 638 which is crimped to the sheath 631b of the cable 631 to hold the cable 631.

The terminal body 633 also includes a top wall 634, a bottom wall 635, and a pair of side walls 636 and 636. An elastic bending portion 634a is formed on the top wall 634, and a projection 635a that protrudes toward the elastic bending portion 634a is formed on the bottom wall 635. The first terminal portion 112 or the second terminal portion 122 is inserted into the gap between the elastic bending portion 634a and the projection 635a. With this structure, the first terminal portion 112 or the second terminal portion 122 is sandwiched between the elastic bending portion 634a and the projection 635a and held in an electrically connected state.

On the other hand, the sensor-body-side housing 62 includes a top wall 621, a bottom wall 622, a pair of side walls 623 and 623, and a connecting wall 624. The connecting wall 624 is integrally formed on the front wall 614 of the terminal-side housing 61.

The sensor-body-side housing 62 includes a sensor body storing space 625 in which the sensor body 10 is removably stored. The sensor body storing space 625 is defined by the top wall 621, the bottom wall 622, and the pair of side walls 623 and 623.

Terminal insertion ports 625a and 625a into which the first terminal portion 112 and the second terminal portion 122 are inserted are formed on the side of the sensor body storing space 625 facing the terminal-side housing 61. In the present embodiment, the terminal insertion port 625a is provided as a through hole 624a formed in the connecting wall 624. Further, the through hole 624a is formed to communicate with the through hole 614a, so that a terminal insertion port 60a of the housing 60 is formed by the through hole 624a and the through hole 614a.

Further, a sensor body insertion port 625b is formed on the side opposite to the terminal insertion port 625a in the sensor body storing space 625, and the sensor body 10 is inserted.

In the present embodiment, elastically deformable latching pieces 621a and 622a are formed on the top wall 621 and the bottom wall 622. By latching the resin mold portion 14 of the sensor body 10 stored in the sensor body storing space 625 on the latching pieces 621a and 622a, the sensor body 10 stored in the sensor body storing space 625 is restricted (positioned). In the present embodiment, the resin mold portion 14 of the sensor body 10 is detachably latched on the latching pieces 621a and 622a.

With this structure, when the sensor body 10 is stored in the sensor body storing space 625, the first terminal portion 112 is electrically connected to the terminal portion 632 of one of the cable-attached terminals 63. Then, the second terminal portion 122 is electrically connected to the terminal portion 632 of the other cable-attached terminal 63.

With this structure, the oil temperature sensor 1A according to the present embodiment is formed.

In the present embodiment, the sensor body 10 and the opponent connector are detachably fitted. In other words, the sensor body 10 is removably stored in the sensor body storing space 625, while the first terminal portion 112 and the second terminal portion 122 are detachably latched on the terminal portions 632 and 632.

A conventional structure can be adopted as a structure for detachably fitting the sensor body 10 and the opponent connector.

The present embodiment can also provide the effect similar to the effect of the first embodiment.

The oil temperature sensor 1A according to the present embodiment includes the sensor body 10 that detects the temperature of oil. The oil temperature sensor 1A includes the housing 60 including the pair of spaces 616 in which the pair of cable-attached terminals 63 is stored, each cable-attached terminal 63 including the cable 631 and the terminal portion 632 connected to the conductor 631a of the cable 631.

The sensor body 10 includes the thermistor 13 and the resin mold portion 14 in which the thermistor 13 is buried.

The sensor body 10 includes the first lead frame 11 on which one end of the thermistor 13 is mounted, and the second lead frame 12 arranged apart from the first lead frame 11 and on which the other end of the thermistor 13 is mounted.

The first lead frame 11 includes the first buried portion 111 on which one end of the thermistor 13 is mounted and which is buried in the resin mold portion 14, and the first terminal portion 112 provided continuously from the first buried portion 111 and exposed from the resin mold portion 14.

The second lead frame 12 includes the second buried portion 121 on which the other end of the thermistor 13 is mounted and which is buried in the resin mold portion 14, and the second terminal portion 122 provided continuously from the second buried portion 121 and exposed from the resin mold portion 14.

The housing 60 includes the sensor-body-side housing 62 including the sensor body storing space 625 which communicates with the pair of spaces 616 and in which the sensor body 10 is removably stored.

With the sensor body 10 stored in the sensor body storing space 625, the first terminal portion 112 is electrically connected to the terminal portion 632 of one of the cable-attached terminals 63. Further, the second terminal portion 122 is electrically connected to the terminal portion 632 of the other cable-attached terminal 63.

With this structure, the sensor body 10 can be replaced and the thermistor 13 can be replaced more easily.

Third Embodiment

An oil temperature sensor 1B according to the present embodiment is formed by attaching a cover 73 in a state in which the first terminal portion 112 and the second terminal portion 122 of the sensor body 10 are directly inserted into a connector unit 70 of the opponent connector (opponent fitting body).

In other words, the oil temperature sensor 1B includes the sensor body 10 that detects the temperature of the oil and the connector unit 70.

The connector unit 70 includes a pair of cable-attached terminals 72, each including a cable 721 and a terminal portion 722 connected to a conductor 721a of the cable 721, and a housing 71 including a pair of spaces 716 in which the pair of cable-attached terminals 72 is stored.

The connector unit 70 has substantially the same shape as the opponent connector 50 described in the first embodiment.

Figure 12:
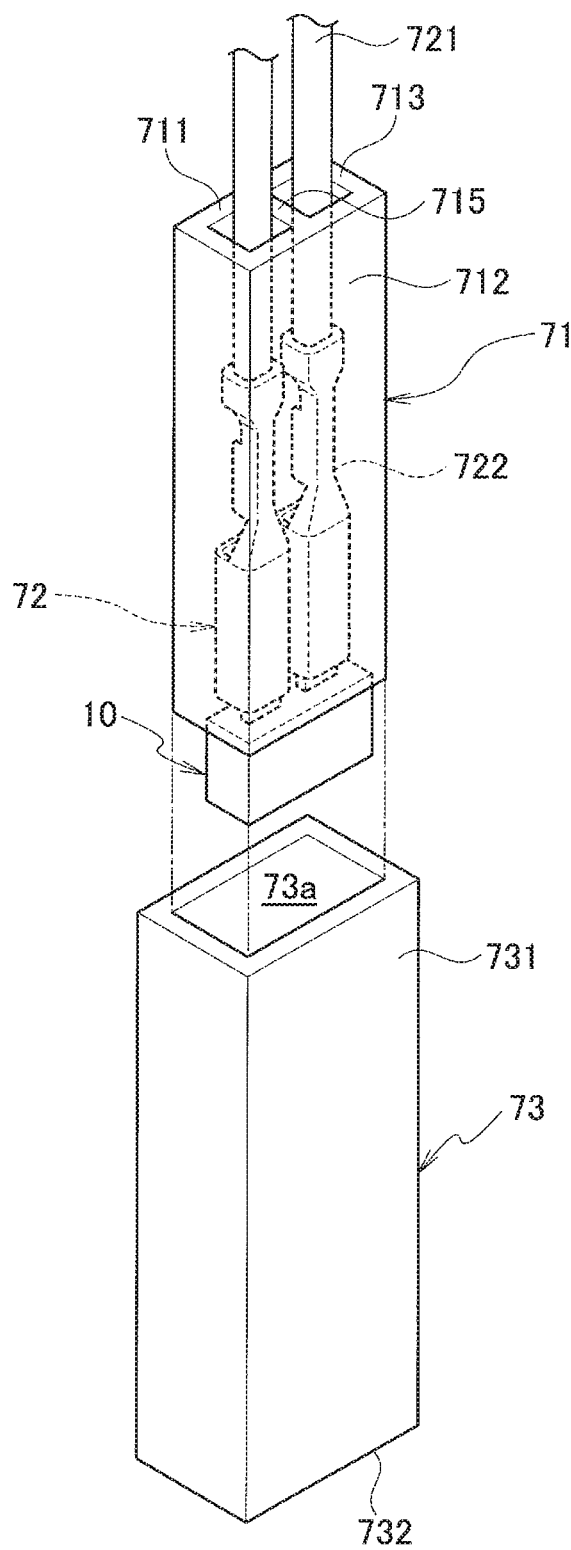
FIG. 12 is a perspective view schematically illustrating an oil temperature sensor according to a third embodiment before a connector portion and a cover are fitted each other.

In other words, the connector unit 70 includes a connector housing 71, as illustrated in FIGS. 12, 13A, and 13B.

The connector housing 71 is formed in a substantially rectangular parallelepiped shape as illustrated in FIGS. 12, 13A, and 13B, and is made of, for example, a synthetic resin. Further, the connector housing 71 includes a top wall 711, a bottom wall 712, and a pair of side walls 713 and 713 provided continuously from both ends of the top wall 711 and the bottom wall 712, respectively, in the width direction. The connector housing 71 also includes a front wall 714 provided continuously from the front ends of the top wall 711, the bottom wall 712, and the side walls 713 and 713.

In the connector housing 71, a plurality of (two in the present embodiment) terminal storing spaces 716 which are divided by a partition wall 715 and opened at both ends are formed.

A terminal insertion port 716a into which the first terminal portion 112 or the second terminal portion 122 is inserted is formed on the side of each terminal storing space 716 facing the sensor body 10. In the present embodiment, the terminal insertion port 716a is provided as a through hole 714a formed in the front wall 714.

A cable outlet 716b is formed on the side opposite to the terminal insertion port 716a of each terminal storing space 716, so that the terminal portion 722 of the cable-attached terminal 72 is inserted into the terminal storing space 716 from the cable outlet 716b. The terminal portion 722 of one of the cable-attached terminals 72 is stored in one terminal storing space 716.

In the present embodiment, an elastically deformable latching piece 711a is formed on the lower surface (inner surface) of the top wall 711 so as to protrude toward the terminal storing space 716. By latching a top wall 724 of the terminal portion 722 stored in the terminal storing space 716 on the latching piece 711a, the cable-attached terminal 72 stored in the terminal storing space 716 is restricted (positioned).

The cable-attached terminal 72 includes the substantially columnar cable 721 and the terminal portion 722 electrically connected to the conductor 721a of the cable 721.

The cable 721 includes the conductor 721a and an insulating sheath 721b covering the outer periphery of the conductor 721a, and the terminal portion 722 is connected to a portion (exposed portion) of the conductor 721a not covered by the sheath 721b. For example, the conductor 721a can be made of aluminum or an aluminum-based alloy.

The terminal portion 722 includes a terminal body 723 having a substantially box shape into which the first terminal portion 112 or the second terminal portion 122 is inserted, and a conductor crimping portion (cable connecting portion) 727 which is crimped to the conductor 721a of the cable 721 and electrically connected to the conductor 721a. The terminal portion 722 also includes a cable holding portion (cable connecting portion) 728 which is crimped to the sheath 721b of the cable 721 to hold the cable 721.

The terminal body 723 also includes the top wall 724, a bottom wall 725, and a pair of side walls 726 and 726. The top wall 724 is formed with an elastic bending portion 724a, and a projection 725a that protrudes toward the elastic bending portion 724a is formed on the bottom wall 725. The first terminal portion 112 or the second terminal portion 122 is inserted into the gap between the elastic bending portion 724a and the projection 725a. With this structure, the first terminal portion 112 or the second terminal portion 122 is sandwiched between the elastic bending portion 724a and the projection 725a and held in an electrically connected state.

In the present embodiment, when the sensor body 10 is held by the connector unit 70, the first terminal portion 112 and the second terminal portion 122 are inserted into the connector housing 71, and the resin mold portion 14 is exposed to the outside of the connector housing 71.

For this reason, in the present embodiment, the cover 73 is attached to the connector housing 71 to cover the resin mold portion 14, thus forming the oil temperature sensor 1B. The cover 73 is removably attached to the connector housing 71.

In the present embodiment, the cover 73 includes a peripheral wall 731 extending in the front-rear direction, and a rear wall 732 provided continuously from the rear end of the peripheral wall 731 to close the opening on the rear side. A space 73a that opens forward (toward the side facing the connector unit 70 in which the sensor body 10 is held) is defined by the inner surface of the peripheral wall 731 and the inner surface of the rear wall 732.

Further, a storing recess in which the sensor body 10 is stored when the cover 73 is attached to the connector housing 71, is formed in the rear wall 732.

Thus, the oil temperature sensor 1B according to the present embodiment is formed.

In the present embodiment, the sensor body 10 is detachably held by the connector unit 70. Specifically, the first terminal portion 112 and the second terminal portion 122 are detachably latched on the terminal portion 722.

A conventional structure may be adopted as a structure for detachably fitting the sensor body 10 and the connector unit 70.

Figure 14:
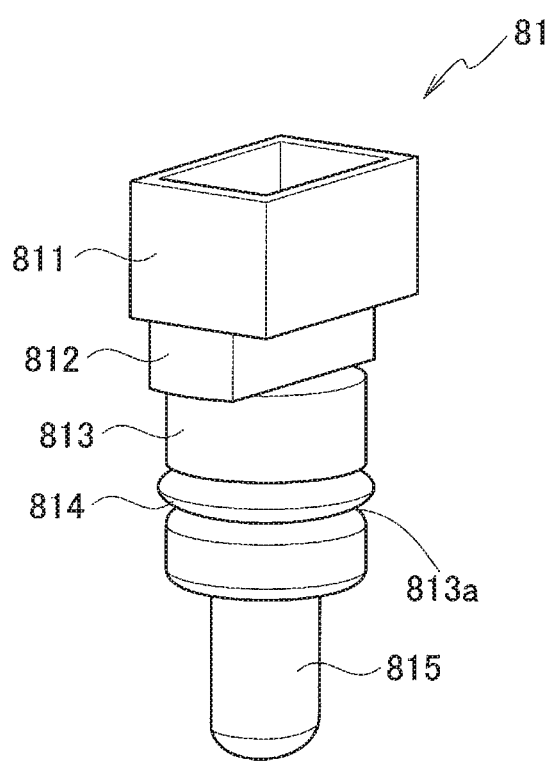
FIG. 14 is a perspective view schematically illustrating a cover according to a modification of the third embodiment.

The cover 73 can be formed as illustrated in FIG. 14. A cover 81 illustrated in FIG. 14 is formed such that the cover 81 can be attached without modification to the insertion hole formed in the mounting member. Specifically, the cover 81 includes a rectangular tube portion 811 having an opening into which the opponent connector is inserted, and a restricting portion 812 that restricts the insertion into the insertion hole. The cover 81 also includes a large-diameter portion 813 inserted into the insertion hole, an O-ring 814 attached to a groove 813a formed in the large-diameter portion 813, and a detection tip 815 in which the thermistor 13 is arranged and is soaked in the oil.

Thus, the shape of the cover can be appropriately set according to the application.

The housing 40 into which the sensor body 10 is inserted may be formed as illustrated in FIG. 14.

The present embodiment can also provide the effect similar to the effect of the first embodiment.

The oil temperature sensor 1B according to the present embodiment includes the sensor body 10 that detects the temperature of oil. The oil temperature sensor 1B includes the connector unit 70 including the pair of cable-attached terminals 72 each having the cable 721 and the terminal portion 722 connected to the conductor 721a of the cable 721, and the housing 71 including the pair of spaces 716 in which the pair of cable-attached terminals 72 is stored.

The sensor body 10 includes the thermistor 13 and the resin mold portion 14 in which the thermistor 13 is buried.

The sensor body 10 includes the first lead frame 11 on which one end of the thermistor 13 is mounted, and the second lead frame 12 arranged apart from the first lead frame 11 and on which the other end of the thermistor 13 is mounted.

The first lead frame 11 includes the first buried portion 111 on which one end of the thermistor 13 is mounted and which is buried in the resin mold portion 14, and the first terminal portion 112 provided continuously from the first buried portion 111 and exposed from the resin mold portion 14.

The second lead frame 12 includes the second buried portion 121 on which the other end of the thermistor 13 is mounted and which is buried in the resin mold portion 14, and the second terminal portion 122 provided continuously from the second buried portion 121 and exposed from the resin mold portion 14.

Each space 716 includes the terminal insertion port 716a into which the first terminal portion 112 or the second terminal portion 122 is introduced.

The sensor body 10 is removably held by the connector unit 70. Specifically, the first terminal portion 112 is inserted from the terminal insertion port 716a of the space 716 in which one of the cable-attached terminals 72 is stored, and is detachably latched on the terminal portion 722. Further, the second terminal portion 122 is inserted from the terminal insertion port 716a of the space 716 in which the other cable-attached terminal 72 is stored, and is detachably latched on the terminal portion 722. With this structure, the sensor body 10 is detachably held by the connector unit 70.

With the sensor body 10 held by the connector unit 70, the cover 73 covering the portion of the sensor body 10 exposed to the outside of the connector unit 70 is detachably attached to the housing 71.

With this structure, the sensor body 10 can be replaced and the thermistor 13 can be replaced more easily.

Although preferred embodiments of the invention have been described, the present invention is not limited to the above embodiments, and various modifications are feasible.

What is claimed is:

1. An oil temperature sensor, comprising:
   a sensor body that detects a temperature of oil; and
   a housing in which a space is formed and detachably fitted to an opponent fitting body, wherein
   the sensor body includes
   a thermistor,
   a resin mold portion in which the thermistor is buried,
   a first lead frame including a first buried portion on which one end of the thermistor is mounted and which is buried in the resin mold portion, and a first terminal portion provided continuously from the first buried portion and exposed from the resin mold portion, and
   a second lead frame including a second buried portion on which the other end of the thermistor is mounted and which is buried in the resin mold portion, and a second terminal portion provided continuously from the second buried portion and exposed from the resin mold portion, the second lead frame being arranged apart from the first lead frame, and
   the sensor body is fixed to the housing in a manner that the resin mold portion is buried and the first terminal portion and the second terminal portion are partially exposed to the space, wherein
   the first buried portion includes a first recess which is opened toward the second buried portion and in which one end of the thermistor is mounted, and
   the second buried portion includes a second recess at a position facing the first recess, the second recess being opened toward the first buried portion and the other end of the thermistor being mounted in the second recess.

2. The oil temperature sensor according to claim 1, wherein the first recess is formed to be stepwise so that a depth of the first recess becomes deeper toward the second recess, and the second recess is formed to be stepwise so that a depth of the second recess becomes deeper toward the first recess.

3. An apparatus, comprising:
   a sensor body that detects a temperature of oil; and
   a housing including a pair of spaces in which a pair of cable-attached terminals each including a cable and a terminal portion connected to a conductor of the cable is stored, wherein
   the sensor body includes
   a thermistor,
   a resin mold portion in which the thermistor is buried,
   a first lead frame including a first buried portion on which one end of the thermistor is mounted and which is buried in the resin mold portion, and a first terminal portion provided continuously from the first buried portion and exposed from the resin mold portion, and
   a second lead frame including a second buried portion on which the other end of the thermistor is mounted and which is buried in the resin mold portion, and a second terminal portion provided continuously from the second buried portion and exposed from the resin mold portion, the second lead frame being arranged apart from the first lead frame,
   the housing includes a sensor-body-side housing communicating with the pair of spaces and including a sensor body storing space in which the sensor body is removably stored, and
   with the sensor body stored in the sensor body storing space, the first terminal portion is electrically connected to a terminal portion of one of the cable-attached terminals and the second terminal portion is electrically connected to a terminal portion of the other cable-attached terminal.

4. The apparatus according to claim 3, wherein
   the first buried portion includes a first recess which is opened toward the second buried portion and in which one end of the thermistor is mounted, and
   the second buried portion includes a second recess at a position facing the first recess, the second recess being opened toward the first buried portion and the other end of the thermistor being mounted in the second recess.

5. The apparatus according to claim 4, wherein the first recess is formed to be stepwise so that a depth of the first recess becomes deeper toward the second recess, and the second recess is formed to be stepwise so that a depth of the second recess becomes deeper toward the first recess.

6. An apparatus, comprising:
   a sensor body that detects a temperature of oil; and
   a connector unit including a pair of cable-attached terminals each including a cable and a terminal portion connected to a conductor of the cable, and a housing including a pair of spaces in which the pair of cable-attached terminals is stored, wherein
   the sensor body includes
   a thermistor, a resin mold portion in which the thermistor is buried,
a first lead frame including a first buried portion on which one end of the thermistor is mounted and which is buried in the resin mold portion, and a first terminal portion provided continuously from the first buried portion and exposed from the resin mold portion, and
a second lead frame including a second buried portion on which the other end of the thermistor is mounted and which is buried in the resin mold portion, and a second terminal portion provided continuously from the second buried portion and exposed from the resin mold portion, the second lead frame being arranged apart from the first lead frame,
each of the pair of spaces includes a terminal insertion port into which the first terminal portion or the second terminal portion is inserted,
the sensor body is removably held by the connector unit in a manner that the first terminal portion is inserted from the terminal insertion port in the space in which one of the cable-attached terminals is stored and detachably latched on the terminal portion, and the second terminal portion is inserted from the terminal insertion port in the space in which the other cable-attached terminal is stored and detachably latched on the terminal portion, and
with the sensor body held by the connector unit, a cover covering a portion of the sensor body exposed to the outside of the connector unit is detachably attached to the housing.

7. The apparatus according to claim 6, wherein
the first buried portion includes a first recess which is opened toward the second buried portion and in which one end of the thermistor is mounted, and
the second buried portion includes a second recess at a position facing the first recess, the second recess being opened toward the first buried portion and the other end of the thermistor being mounted in the second recess.

8. The apparatus according to claim 7, wherein the first recess is formed to be stepwise so that a depth of the first recess becomes deeper toward the second recess, and the second recess is formed to be stepwise so that a depth of the second recess becomes deeper toward the first recess.

* * * * *